(12) United States Patent
Zhang et al.

(10) Patent No.: US 9,317,783 B2
(45) Date of Patent: Apr. 19, 2016

(54) CLUSTERING IMAGES

(75) Inventors: Wei Zhang, Fremont, CA (US); Tong Zhang, San Jose, CA (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 402 days.

(21) Appl. No.: 13/701,632

(22) PCT Filed: Jun. 1, 2010

(86) PCT No.: PCT/US2010/036899
§ 371 (c)(1),
(2), (4) Date: Jun. 17, 2013

(87) PCT Pub. No.: WO2011/152821
PCT Pub. Date: Dec. 8, 2011

(65) Prior Publication Data
US 2013/0279816 A1  Oct. 24, 2013

(51) Int. Cl.
*G06K 9/62* (2006.01)
*G06K 9/00* (2006.01)

(52) U.S. Cl.
CPC .......... *G06K 9/6267* (2013.01); *G06K 9/00234* (2013.01); *G06K 9/00362* (2013.01); *G06K 9/00671* (2013.01)

(58) Field of Classification Search
CPC .......... G06K 9/00234; G06K 9/00362; G06K 9/00671; G06K 9/6267
See application file for complete search history.

(56) References Cited

U.S. PATENT DOCUMENTS

| | | | |
|---|---|---|---|
| 2006/0251338 A1* | 11/2006 | Gokturk et al. | 382/305 |
| 2007/0030391 A1* | 2/2007 | Kim et al. | 348/564 |
| 2007/0237364 A1* | 10/2007 | Song et al. | 382/115 |
| 2008/0075361 A1* | 3/2008 | Winn et al. | 382/155 |
| 2008/0089561 A1* | 4/2008 | Zhang | 382/118 |
| 2008/0304755 A1* | 12/2008 | Xiao et al. | 382/225 |
| 2011/0293188 A1* | 12/2011 | Zhang et al. | 382/190 |

* cited by examiner

*Primary Examiner* — Utpal Shah
*Assistant Examiner* — Pinalben Patel
(74) *Attorney, Agent, or Firm* — Mannava & Kang, P.C.

(57) ABSTRACT

A method and system for clustering images, comprising detecting faces in respective images to generate face data, generating a first cluster of images using the face data, the first cluster comprising images with a common face and representing a corresponding person, generating a second cluster of images using clothes data representing a set of clothing signatures, the second cluster comprising images with a common set of clothes, and using the first and second clusters to link an image of the person to the clusters in order to generate a third cluster for the person.

12 Claims, 5 Drawing Sheets

CLUSTERING IMAGES

BACKGROUND

Automatic clustering of people featured in images within an image collection based on face information has been studied and built into commercial photo organization systems. However, existing clustering techniques can perform poorly when there are large pose variations or occlusions, which are not uncommon in consumer images. In general, the precision rate of the grouping of faces in clusters can be relatively high. That is to say, for most of the clusters, each cluster can contain the faces of a single person, with major clusters usually corresponding to major family members for example. However, the recall rates of face clusters can be unsatisfactory with only a fraction of an individual's images in the photo collection included in his/her corresponding face cluster. This can be exacerbated by the provision of a number of small/singleton clusters of, for example, major family members that cannot be easily allocated to the major clusters. When the number of non-major clusters is large, this could essentially result in the requirement for a user to label faces one by one in a collection. The recall rate of face clusters can be reduced by two things: firstly, missed detections in a face detection stage; and secondly, ill-illumination, image blurring and pose variations, as well as occlusion of human faces due to an uncontrolled capture environment.

Clothing information has been employed in a number of prior approaches in order to provide additional cues to face information for the purpose of human identification. In prior methods, the clothing information and face information are fused at the distance metric level. That is, these methods normalize and then sum up (with or without weights) the separate distance matrices computed based on different information into a single distance matrix, which is then used to cluster images of the person. This information fusion method is expensive in terms of required computation and memory. Also, valuable discriminative information is likely to be lost in the matrix processes.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Reference will now be made in detail to certain implementations, examples of which are illustrated in the accompanying drawings. In the following detailed description, numerous specific details are set forth in order to provide a thorough understanding of the implementations. Well-known methods, procedures, components, circuits, and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first item could be termed a second item, and, similarly, a second item could be termed a first item, without departing from the scope of the present invention.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
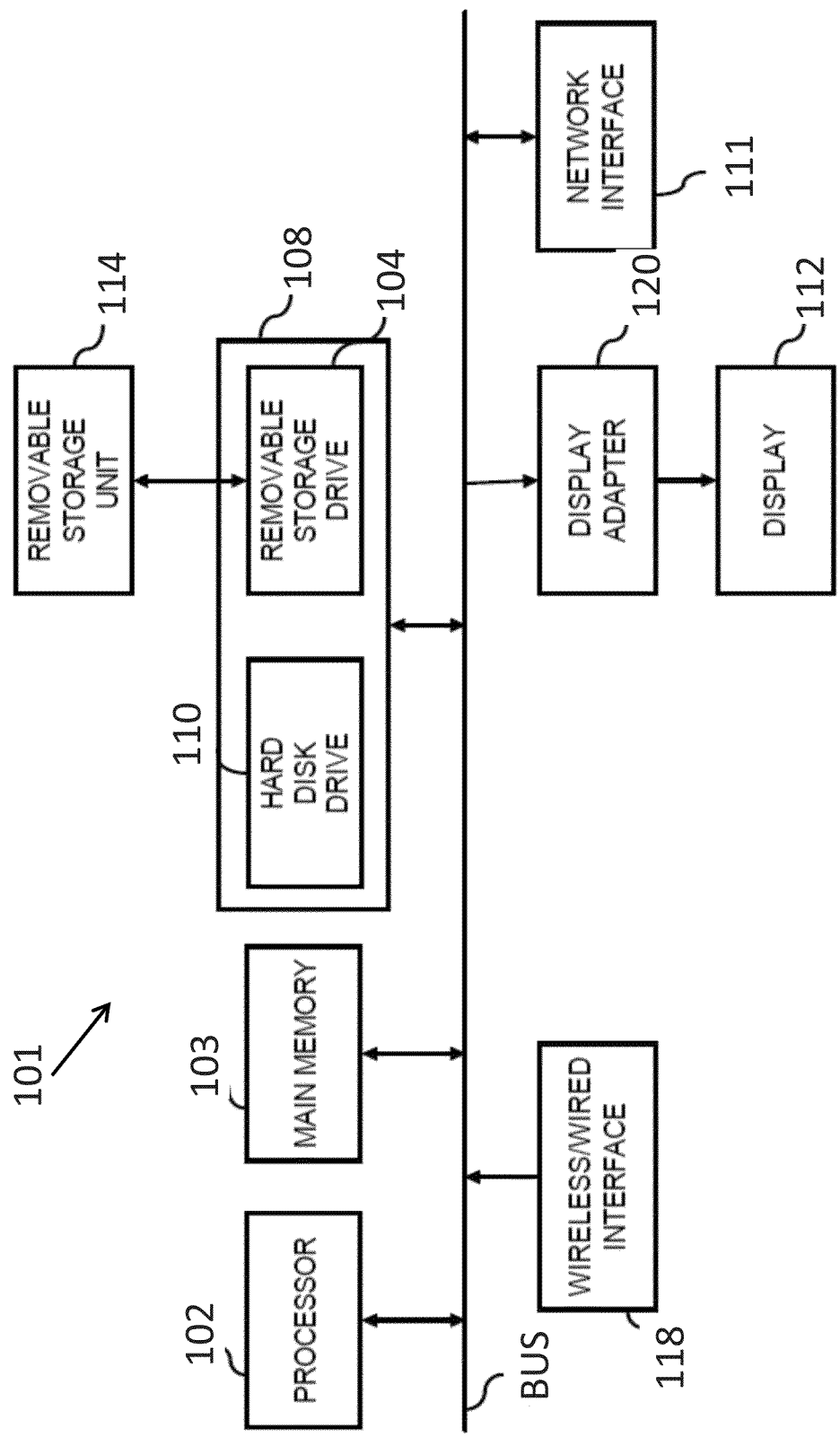
FIG. 1 is a functional block diagram of a computing apparatus.

FIG. 1 is a functional block diagram depicting an architecture of a computing apparatus 101 suitable for use in a process according to certain embodiments. The apparatus comprises a data processor 102, which can include one or more single-core or multi-core processors of any of a number of computer processors, such as processors from Intel, AMD, and Cyrix for example. As referred to herein, a computer processor may be a general-purpose processor, such as a central processing unit (CPU) or any other multi-purpose processor or microprocessor. The processor 102 comprises one or more arithmetic logic units (not shown) operable to perform operations such as arithmetic and logical operations of the processor 102.

Commands and data from the processor 102 are communicated over a communication bus or through point-to-point links (not shown) with other components in the apparatus 101. More specifically, the processor 102 communicates with a main memory 103 where software can be resident during runtime. A secondary memory (not shown) can be used with apparatus 101. The secondary memory can be, for example, a computer-readable medium that may be used to store software programs, applications, or modules that implement embodiments of the invention, or parts thereof. The main memory 103 and secondary memory (and optionally a removable storage unit 114) each includes, for example, a hard disk drive 110 and/or a removable storage drive such as 104, which is a storage device connected to the apparatus 101 via a peripherals bus (such as a PCI bus for example) and representing a floppy diskette drive, a magnetic tape drive, a compact disk drive, etc., or a non-volatile memory where a copy of the software is stored. In one example, the secondary memory also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. Apparatus 101 can optionally comprise a display 112 connected via the peripherals bus (such as a PCI bus), as well as user interfaces comprising one or more input devices, such as a keyboard, a mouse, a stylus, and the like. A network interface 111 can be provided for communicating with other computer systems via a network.

Embodiments of the present invention can be implemented by a dedicated hardware module, such as an ASIC, in one or more firmware or software modules, or in a combination of the same. A firmware embodiment would typically comprise instructions, stored in non-volatile storage, which are loaded into the CPU 102 one or more instructions at a time. A software embodiment would typically comprise one or more application programs that is/are loaded from secondary memory into main memory 103, when the programs are executed.

According to an embodiment, a library of images is processed in order to detect faces present within any of the images. Images in which one or more faces have been detected are clustered into sub-sets, each of which comprise images in which at least a common person appears. For example, one cluster could comprise a sub-set of images from the library with one particular family member present therein. This does not preclude the provision of other people being present in those images, however it may be likely that such people will also have a dedicated cluster representing them. In addition to face clustering, the library of images is also separately clustered according to clothing information determined using clothing signatures. More specifically, a set of clothing signatures are generated representing the clothing worn by people in the images of the library, with images in which people appear wearing the same or similar clothing clustered into respective sub-sets for clothing. A measure of similarity is determined by considering a distance metric between signatures using for example the Earth Mover's Distance measure. The results from the two types of clustering are fused at the cluster level in order to generate person clustering for the library.

Figure 2:
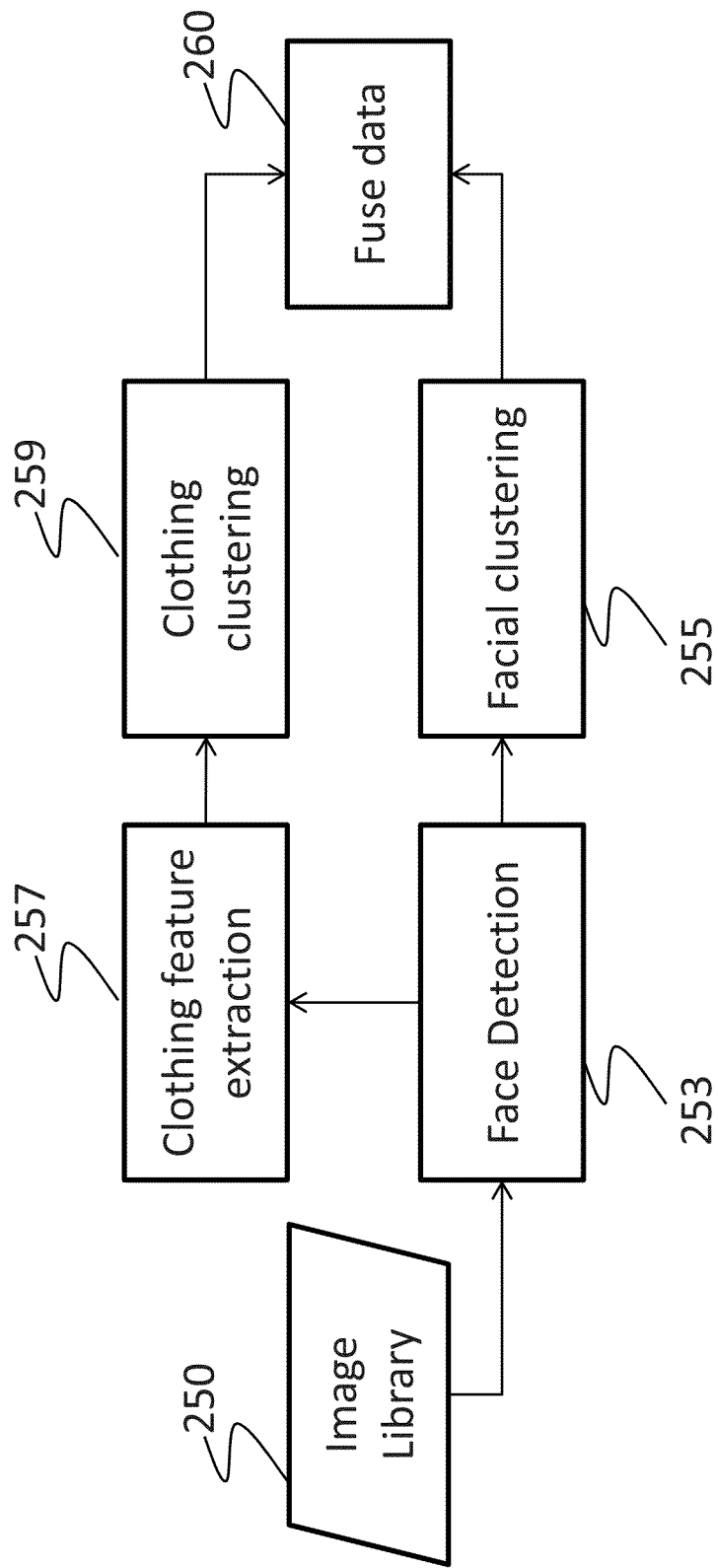
FIG. 2 is a functional block diagram of a system for clustering according to an embodiment.

FIG. 2 is a functional block diagram depicting an overview of a system for clustering according to an embodiment. In an image library 250 comprising a number of digital images, face detection 253 is performed using a face detector of the system. In general, all images in an image collection are processed in order to detect faces. However, it can be desirable to limit the face detection stage to only a sub-set of images, particularly if the image collection is very large. The detected faces, represented as face data, are clustered, 255, into sub-sets comprising images having at least one common face. The common face is the person who is considered the subject of the cluster—accordingly, multiple clusters may contain a proportion of images which are the same, but which have several people therein such that different people are the subject of the respective clusters. According to an embodiment, major clusters can be determined. A cluster in which a person appears in a large number of images can be classified as a major cluster. The number required to classify a cluster as a major cluster can be a predetermined number (e.g. a number between 5 and 10), or it can be a proportion of the number of images in the library (such as 10% for example), or can be determined in response to the number of clusters which have been determined. For example, the largest (by image number) 10% of determined clusters can be classified as major clusters. Other alternatives are possible as will be apparent.

For images in the library 250, clothing information is also leveraged. More specifically, the images are processed in order to determine and extract clothing features 257. Accordingly, from a set of detected faces in the images, a rough position for a clothing mask for a person can be determined. The clothing mask is used to generate a clothing signature. If a particular person present in the image is wearing, for example, three sets of clothes in different images, then the features of the three sets of clothes can be extracted in order to provide distinct clothing signatures for the sets of clothes representative of at least the one of the colour and texture of clothes. The generated clothing signatures are clustered, 259, in order to group the same or similar signatures together such that clusters representing the same or similar clothing for people in the images are determined. For a set of the same clothing in different images, corresponding clothing signatures determined from those different images can be concatenated to provide a combined, representative, signature for that set of clothes.

It is therefore apparent that, for a set of digital images which can form a collection, a face detection stage (253) is used in order to detect a set of faces for the collection. The data representing the detected faces is then used in order to cluster the images into two groups—the first grouping represents a clustering of images based on detected faces. That is to say, images in which a common detected face appears are clustered into a first cluster (255). The second grouping represents a clustering of images based on detected clothing features, in the form of clothes signatures.

Fusion of clothing and facial information is then performed, 260. Since the clothing clusters are usually distributed quite differently from face clusters, and the clothing clusters can provide very valuable information to complement the facial information, the facial and clothing information is combined at the cluster level. That is, the face clusters are directly merged based on the clothing clustering results. More specifically, since the face clusters and clothing clusters are determined from the library 250 separately, the distribution of the clothing clusters is used to automatically merge smaller face clusters of the same person into a corresponding major face cluster in order to provide a cluster for that person.

Figure 3:
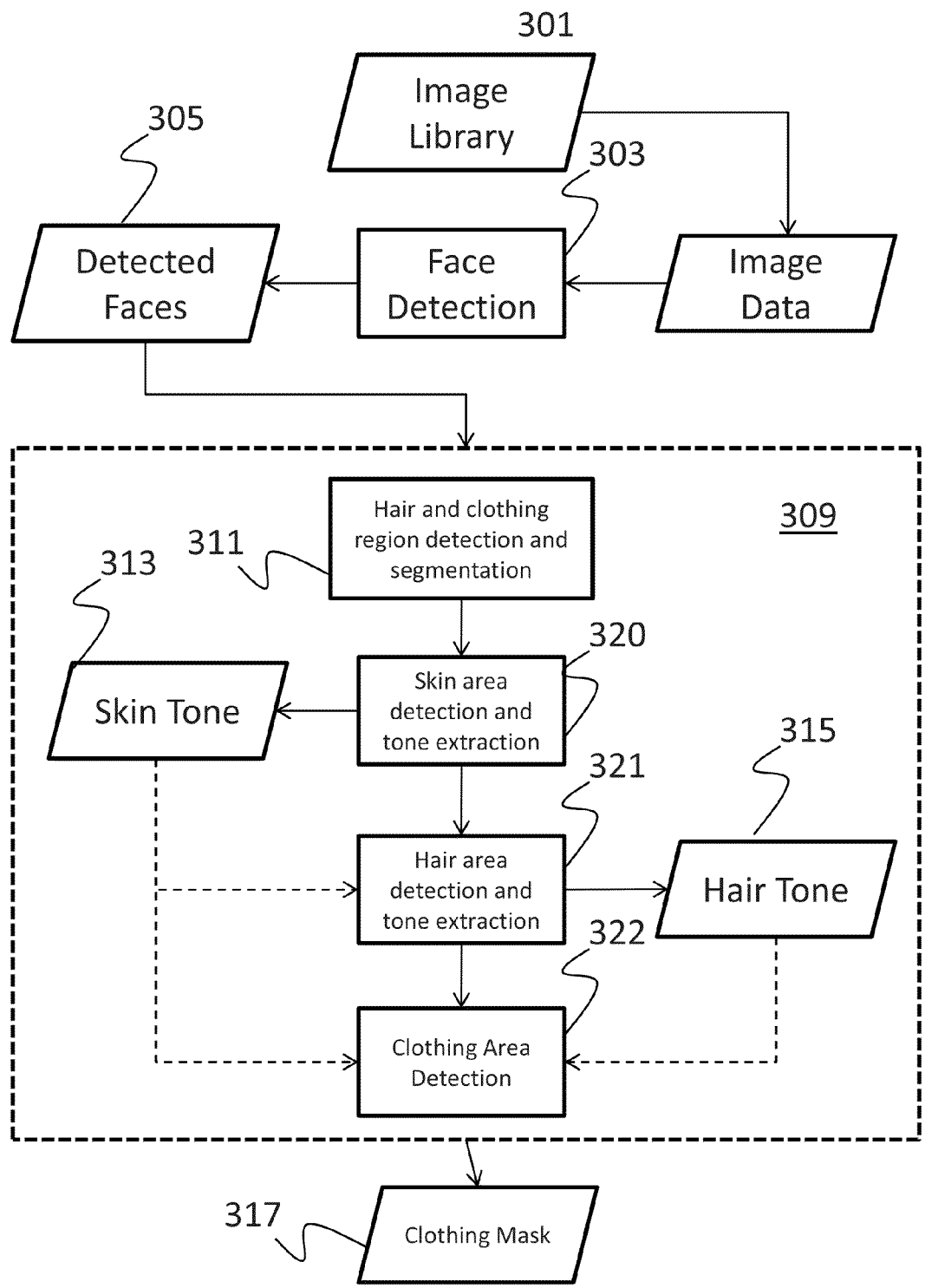
FIG. 3 is a further functional block diagram of a system for clustering according to an embodiment.

FIG. 3 is a functional block diagram of an image processing method according to an embodiment. An image library 301, stored on HDD 110 for example, comprises a collection of digital images (not shown). Such digital images can be images which have been captured by an image capture device such as a digital camera for example, or can be digital images representing physical counterparts, which have been scanned into digital format for example. In any case, the image collection comprises at least a subset of images which have as their subject, or otherwise comprise, one or more people, the faces of whom may be visible, partially occluded, or not visible. That is to say, one or more persons may or may not be present in each image of the library, such that a subset of images in the collection may be devoid of a person altogether.

An acquired digital image from the image library is processed at step 303 in order to detect any faces within the image. According to an implementation this step is repeated for all the images in the image library in order to provide a set of detected faces 305 which is represented as face data for the collection. It can be desirable to process all or some images remotely from the user—for example, images stored remotely using an image storage service can be processed at that location, and the results fed back to a user's location. It will be appreciated that any combination of the above can be implemented as desired. According to an embodiment, a face detection method such as that described in P. Viola and M. Jones. "Rapid object detection using a boosted cascade of simple features," IEEE Conf. Computer Vision Pattern Recognition, 2001, the contents of which are incorporated herein in their entirety by reference, can be used.

The resultant detected faces 305 are used to determine corresponding clothing data for respective people whose faces have been detected, as well as respective head/hair positions. More specifically, dependent on the size of the detected face, a notional bounding box can be positioned over the detected face—such face boxes are conventional and no special requirements need be met. In fact, the face box merely acts as a reference for the definition of regions for the hair and clothes of a person which allows the generation of a clothing signature. According to an embodiment, corresponding clothing (322) and hair boxes (321) are placed below and above the automatically detected face box according to a set of heuristic ratios, and the sizes of these boxes are normalized according to the size of the face box. The sizes and positions of the boxes relative to the face box can be defined as, for example: width_hair=0.6*width_face, height_hair=0.4*height_face; centerx_hair=centerx_face; centery_hair=topy_face−0.3*height_face; width_clothing=1.6*width_face, height_clothing=2.0*height_face; centerx_clothing=centerx_face; centery_clothing=bottomy_face+1.2*height_face. Other alternatives are possible, however the ratios given above have been found to give good results. Measurements can be in pixels for example, or some other suitable unit. An initial bounding box for a detected face is positioned and sized according to the algorithm defined in the Viola. Jones method referenced above.

Figure 4:
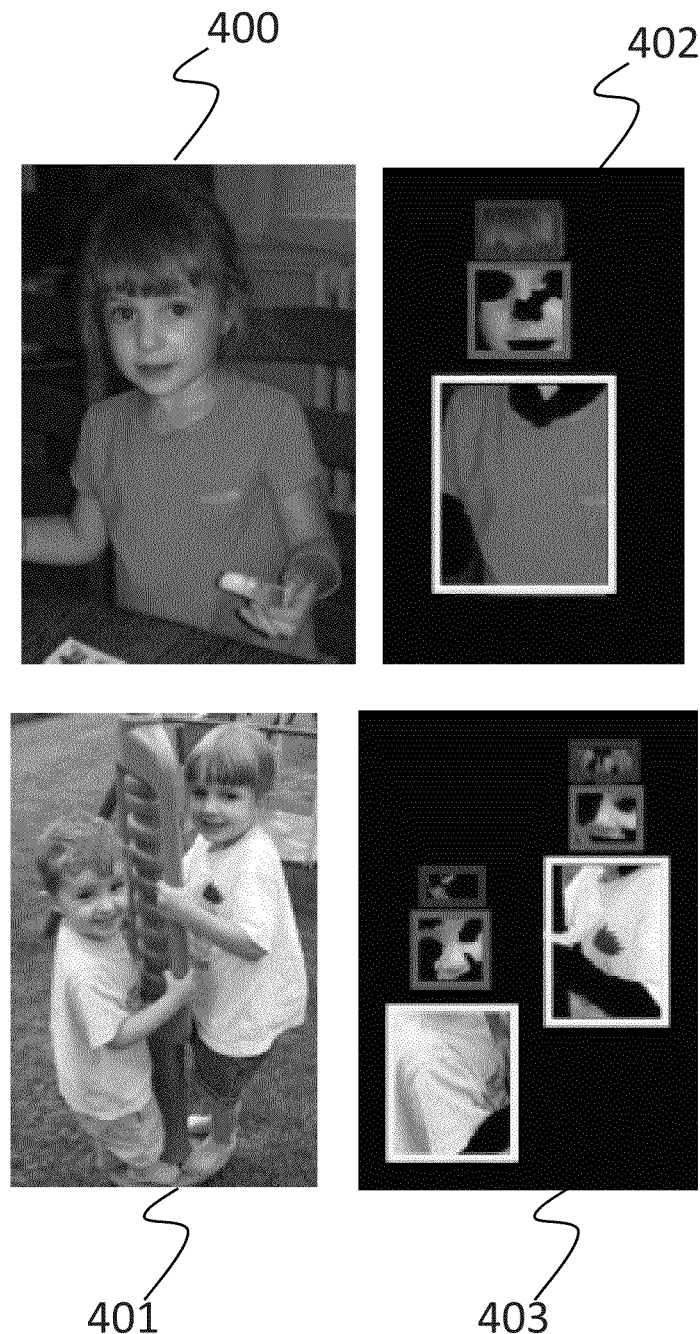
FIG. 4 is a schematic representation for segmenting hair and clothing regions and obtaining skin tone, hair tone and a clothing mask.

FIG. 4 is a schematic representation of two images 400, 401 which have been processed according to an embodiment in order to determine face, clothing and hair bounding boxes. For image 400, clothing and hair bounding boxes are sized and positioned based on the size and location within the image of the detected face. Other regions can be discarded, resulting in only the face, clothing and hair information 402. Similarly for FIG. 401, in which two children are present, the size and position of the detected faces provides the basis for the clothing and hair bounding boxes of 403.

For each image, the face region of a detected face is segmented 311 in order to detect skin areas 320. According to an embodiment, a multi-scale normalized cut algorithm is applied to segment each region into homogeneous segments. A suitable algorithm is described in T. Cour, F. Benezit, and J. Shi. "Spectral segmentation with multiscale graph decomposition," CVPR, 2005, the contents of which are incorporated herein in their entirety by reference. Refined regions are obtained by removing two types of segments. Firstly, small segments are removed. These segments usually correspond to background clutter, shadowed areas, or other non-dominant areas in the region. Secondly, overlapping segments are removed. These segments are the areas expected to belong to other body parts. More specifically, the skin segmentation is obtained by removing the small segments within the skin region.

In the refined regions, the skin tone 313 of the person is extracted by clustering the pixels in the skin areas under the CIElab color space, which is a perceptually uniform colour space (such that a small perturbation to a component value is approximately equally perceptible across the range of that value). Other colour spaces can be used, as will be appreciated by those skilled in the art. The determined skin tone is than used to remove the skin areas in the hair region for the person. Accordingly, the skin tone of a person is learned from within the person's face box. The segments remaining after small region removal form the refined regions for the skin mask. The color value of each pixel in the skin mask in the refined regions is extracted and pooled. These color values are representative of the skin color of the person. The pooled color values are clustered using a Gaussian Mixture Modeling algorithm in order to provide a skin signature for the person (which can also be termed skin tone). The skin signature is used to remove the skin-like areas within other contextual regions, such as the hair and clothing regions. Referring to FIG. 4, it can be seen that certain regions in the hair and face bounding boxes for each image 400, 401 are blacked out, corresponding to the removal of pixels within those areas as a result of skin tone determination, and skin region removal as appropriate.

Accordingly, for skin segmentation and skin tone extraction:

Within a face box detected by face detector, a multi-scale normalized cut algorithm is run to segment the box into homogeneous segments. The areas of the segments need not necessarily be equal. However, the texture within each segment can be uniform. Some (50% for example) of the segments that are smaller are removed because they usually correspond to background regions or shadowed regions on the face. The remaining segments form the skin segmentation region of the detected face. For each pixel within the skin segmentation region, the pixel's color value vector is extracted (which is a 3 dimensional vector in the CIELab color space). Thus there is a pool of color value vectors from the skin segmentation region. Using this vector pool, a Gaussian Mixture Model (GMM) with diagonal covariance matrix is generated in order to cluster the color value vectors. The resultant GMM is the skin tone 313 of the person, and can be used for skin tone matching in subsequent images for example.

The hair tone 315 of the person is extracted in the refined hair region in similar way to the skin tone. The skin tone and the hair tone are used to remove the skin and hair areas in the clothing region to obtain a final clothing mask for the person. This is repeated for each detected face in each image in order to obtain a clothing mask for each detected (by face) person in each image. Thus, clothing features in the form of a clothing mask 317 are extracted within the cleaned clothing region. The images can be white-balanced and down-scaled if desired in order to maintain white balance uniformity across images, and to speed up processing.

According to an embodiment, the GMMs generated are probabilistic models for density estimation that define the required skin/hair tone signature of the person. Note that, CIELab describes all the colors visible to the human eye. The three coordinates of CIELab represent the luminance of the color (L=0 yields black and L=100 indicates diffuse white; specular white may be higher), its position between red/magenta and green ("a", negative values indicate green while positive values indicate magenta) and its position between yellow and blue ("b", negative values indicate blue and positive values indicate yellow). Since the Lab model is a three-dimensional model, it can only be represented properly in a three-dimensional space. Other alternatives are possible, such as using one of the other colour space models for example.

Clothing segmentation and clothing feature extraction proceeds in a similar fashion, that is to say, within the identified clothing box (corresponding to the face box), the box is segmented into regions in the same way as above. Similarly, a proportion (such as 50% for example) of the relatively smaller segments are discarded. The identified skin tone is then compared to each of the remaining segments, and any skin-like segments are discarded. The identified hair tone is also compared to each of the remaining segments, and any hair-like segments are discarded. All remaining segments are defined as those which belong to clothing, and therefore form the clothing segmentation region, or mask, for the image and the person in question (note there might be multiple people detected in one image). At each pixel within the clothing segmentation region, the pixel's color value vector is extracted (again, a 3-dimensional vector, in CIELab color space), and a Gaussian Mixture Model (GMM) with a diagonal covariance matrix is generated to cluster the color value vectors. The obtained GMM is the color signature, or descriptor, of the clothing. At each pixel within the clothing segmentation region, the pixel's texture value vector is also extracted by convolving the clothing segmentation with a suitable filter bank. The texture value vectors are clustered in the same way as above, with the resultant GMM defining the texture signature of the clothing.

Accordingly, clothing segmentation and clothing feature extraction proceeds as follows:

For the clothing box—which has been determined on the basis of the size and position within the image in question of the face box corresponding to a detected face—segmentation is performed in the same way as above. Thus, according to an embodiment, 50% of the relatively smaller segments are removed. The determined skin tone is then compared to each of the remaining 50% segments using the skin tone signature, and any determined skin-like segments are discarded. The determined hair tone is also compared to each of the remaining segments using the hair tone signature, and any determined hair-like segments are discarded. All the remaining segments belong to clothing. These segments thus form the clothing segments for the person. At each pixel within the clothing segmentation, the pixel's color value vector is extracted, and a GMM is generated in order to cluster the color value vectors in order to generate the color signature of the clothing. Also, at each pixel within the clothing segmentation, the pixel's texture value vector is extracted (by convolving the clothing segmentation with a filter bank). A GMM is generated in order to cluster the texture value vectors in order to provide a texture signature for the clothing.

In the approaches described above, a number of Gaussian functions are taken as an approximation to a multi-modal distribution in the desired colour/texture space and conditional probabilities are then computed for colour/texture pixels. The conditional probability density for a pixel x belonging to an object, O, is modeled as a Gaussian mixture with m components:

$$p(O|x) = \sum_{j=1}^{m} p(j|x)\pi(j)$$

where a mixing parameter $\pi(j)$ is the prior probability that x was generated by the j'th component, $$\sum_{j=1}^{m} \pi(j) = 1.$$

Each mixture component, $p(j|x)$, is a Gaussian probability density function with mean $\mu$ and covariance matrix $\Sigma$. An Expectation-Maximization (EM) algorithm can effectively provide a maximum-likelihood solution for fitting such a mixture to a data set.

A color signature for a skin tone, $S_{skin}$ is defined by the centroids and relative sizes of the Gaussian components as:

$S_{skin} = \{(c_1, w_1), (c_2, w_2), \ldots, (c_m, w_m)\}$ where m is the number of components, $c_i$ is the centroid of the ith component, and $w_i$ is the relative size of the ith component, which is defined as the ratio of the number of pixels assigned to the ith component against the total number of pixels. According to an embodiment, a value for m within a range 1<m<50 can be used. More specifically, m=20 is a suitable value, although it will be appreciated that other suitable values can be selected as required, which values can lie outside of the range.

Similarly, the hair tone for a person, $S_{hair}$ within the refined hair segmentation region can be learnt (after the small segments and the skin segments are removed). Then the learned skin tone $S_{skin}$ and hair tone $S_{hair}$ are applied to remove skin and hair segments within the clothing region. A segment is considered to be a skin (hair) segment if it satisfies the following two criteria:

1. The segment is smooth. The smoothness is measured by the variance of the color pixels in CIELab space within the segment.
2. The segment is similar enough to the skin (hair) tone. The dissimilarity is measured by the minimum Mahalanobis distance in CIELab space between the mean of the color pixels within the segment to the Gaussian components of the skin (hair) tone.

A clothing region's texture signature has the same form as above. It is learned by computing the GMM with a diagonal covariance matrix on the texture pixels densely sampled at every pixel within the clothing region. A texture pixel is computed by convolving the clothing region with multi-scale filter banks. According to an embodiment, a filter set such as that used in J. Winn, A. Criminisi, and T. Minka. "Object categorization by learned universal visual dictionary", ICCV, 2005, the contents of which are incorporated herein by reference in their entirety is employed, which is composed of 9 Gaussians, 4 first order derivatives of Gaussians and 4 Laplacian of Gaussians (LoG), applied in CIELab channels. Accordingly, it can be seen that each texture pixel has a dimension of 17.

For a collection of images, a distance matrix provides a measure of the relative similarity of a clothing compared to a given clothing signature. The distance metric between two clothing signatures is determined using the Earth Mover's Distance (EMD) in order to match the main color or texture patterns of the clothes, but neglect more subtle and noisy patterns. The EMD distance between signatures $S_1 = \{(c_1, w_1), \ldots, (c_m, w_m)\}$ and $S_2 = \{(e_1, r_1), \ldots, (e_n, r_n)\}$ is defined as:

$$EMD(S_1, S_2) = \frac{\sum_{i=1}^{m}\sum_{j=1}^{n} f_{ij} \cdot d(c_i, e_j)}{\sum_{i=1}^{m}\sum_{j=1}^{n} f_{ij}}$$

where $f_{ij}$ is a flow value estimated by solving a linear programming problem, $d(c_i, e_j)$ is the base distance between two cluster centers, for example, a Euclidean distance metric. The larger clusters in the signature are weighed higher in this distance metric to emphasize the major patterns. The EMD metric is therefore robust to imperfect segmentation and partial occlusion.

A framework for clustering images based on clothing comprises the following:

Clothing region detection and segmentation—the rough location of clothing regions are located as described above and then a refined clothing segmentation is determined by skin and hair region removal. Clothing feature extraction—features within the clothing regions are extracted based on color, texture, and other image content. Clothing feature matching—the distance (dissimilarity) between each pair of clothes is measured by matching their clothing features.

A distance matrix D is then generated, in which each item of the matrix represents the dissimilarity between two pieces of clothing. This distance matrix is used to cluster people using clothing information. More specifically, based on the distance matrix D, average-link hierarchical clustering is applied to group all the clothes pieces into multiple clothing clusters. For example, given a set of N signatures (descriptors) to be clustered, the basic process for hierarchically clustering the signatures can proceed as:

1) Start by notionally assigning each signature to its own cluster. Let the distances (similarities) between the clusters equal to the distances (similarities) between the items they contain;
2) Find the closest (most similar) pair of clusters and merge them into a single cluster, so that there is one less cluster;
3) Compute distances (similarities) between the new cluster and each of the old clusters.

Repeat steps 2 and 3 until all items are clustered into a desired number of clusters. Step 3 can be done in numerous different ways—for example, using single-link clustering the distance between one cluster and another cluster is taken to be equal to the shortest distance from any member of one cluster to any member of the other cluster. If the data consist of similarities, the similarity between one cluster and another cluster is taken to be equal to the greatest similarity from any member of one cluster to any member of the other cluster. In complete-link clustering the distance between one cluster and another cluster is taken to be equal to the longest distance from any member of one cluster to any member of the other cluster. In average-link clustering, the distance between one cluster and another cluster is taken to be equal to the average distance from any member of one cluster to any member of the other cluster.

Two constraints can be incorporated in the clustering process: (1) Person-Exclusive: assuming one person can only appear once in a photo. Pieces of clothing corresponding to different faces within one photo are forced to be assigned to different clusters; (2) Same-Day: in order to capture the event-specific patterns of clothes, only photos captured at the same day are allowed to be grouped into the same cluster. This is based on the assumption that people usually do not change their clothing at the same day; but likely to change at different days. These constraints help in achieving high-precision clothing clusters. Alternatively to (2), a predefined time period can be used which can be of longer or shorter duration as required.

Accordingly, face clusters and clothing clusters are separately generated, and the distribution of the clothing clusters is used to automatically merge smaller face clusters of the same person into the corresponding major face cluster. That is, for a given major face cluster C, a search is performed among the non-major face clusters so that the associated clusters C' are determined which satisfy the following condition:

$$\left| \left( \bigcup_{f' \in C'} \overline{C_{f'}} \right) \cap \left( \bigcup_{f \in C} \overline{C_f} \right) \right| \geq \vartheta$$

where $C_f$ denotes the index of the clothing cluster corresponding to face f and $\theta$ is a predefined threshold. The inequality indicates that there are at least $\theta$ photos in cluster C' comprising people that share the same clothing with people in one or more photos in C. The associated clusters are the candidates to be merged into the major face cluster, automatically or manually.

By employing clothing information, the approach described can automatically merge more photos of one person into his (her) major face cluster with high accuracy, thus significantly reducing the user operations required to annotate a photo album for example.

Figure 5:
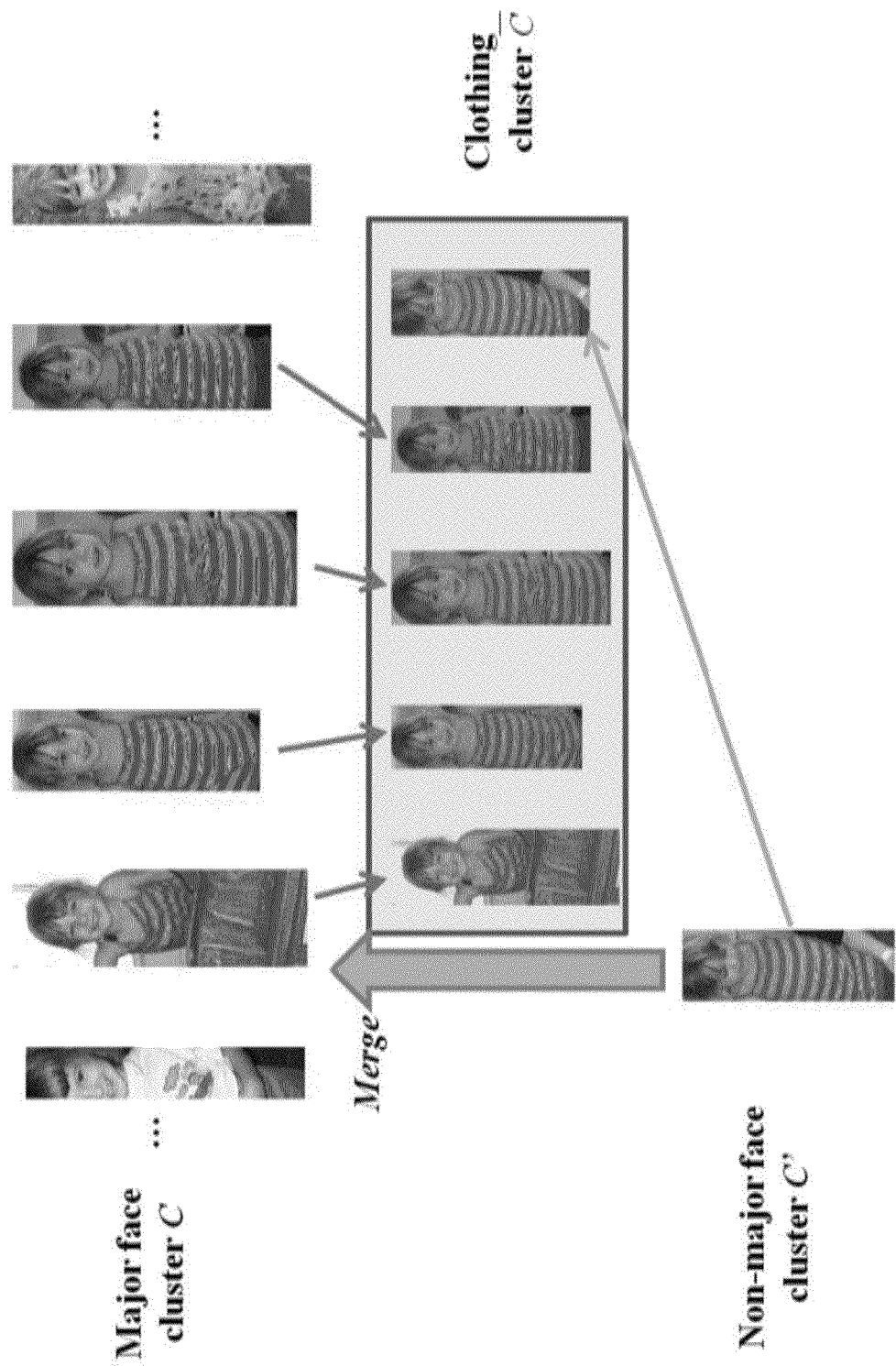
FIG. 5 is a schematic representation of a non-major face cluster merged into a corresponding major face cluster using clothing information.

FIG. 5 is a schematic representation of a non-major face cluster merged into a corresponding major face cluster using clothing information. A major face cluster C comprises a set of images with a common person, as illustrated. A clothing cluster $\overline{C}$ comprises a set of images in which clothing features match with each other, and thus they are images containing one same set of clothes. Due to partial occlusion of the face, face clustering has failed to include the face in the non-major cluster C' to the major face cluster C. However, from the clothing clustering result, the image in C' and several images in the major face cluster C all belong to the clothing cluster $\overline{C}$. Thus, it is determined that the image in the non-major cluster C' can be attributed to the major face cluster C.

What is claimed is:

1. A method for clustering images, comprising:
   detecting faces in respective images to generate face data;
   generating a first cluster of images using the face data, the first cluster comprising images with a common face and representing a corresponding person;
   generating a set of clothing signatures in which regions of the face data corresponding to the faces and hair are disregarded;
   generating a second cluster of images using clothes data representing the set of clothing signatures, the second cluster comprising images with a common set of clothes, the second cluster separately clustering the images as compared to the first cluster according to clothing worn by people in the images irrespective of the people wearing the clothing; and
   using the first and second clusters to link an image of the person to the clusters in order to generate a third cluster for the person,
   wherein a clothing signature is generated by:
      using the face data, defining respective facial regions for identified faces, and, on the basis of the facial regions, defining respective corresponding regions for hair and clothing;
      using image pixel data within the facial and hair regions, generating a measure of the skin and hair tones for the person; and
         using the measure to discard those regions of the image corresponding to skin and hair within the clothing region in order to provide a clothing mask representing a region of clothing for the person.

2. The method as claimed in claim 1, further comprising:
   segmenting the facial, clothing and hair regions into relatively smaller regions; and discarding any of the smaller regions representing background or overlapping areas.

3. The method as claimed in claim 1, further comprising:
   generating a distance matrix in which each item of the matrix represents a dissimilarity between two pieces of clothing.

4. The method as claimed in claimed 3, further comprising:
   using the distance matrix, grouping clothes pieces into multiple clothing clusters using average-link hierarchical clustering.

5. An image processing system for clustering a set of images comprising:
   a processor;
   a non-transitory computer-readable medium storing computer code executable by the processor to:

detect faces in respective images in the set to generate face data;

generate a first cluster of images using the face data, the first cluster comprising images with a common face and representing a corresponding person;

generate a set of clothing signatures in which regions of the face data corresponding to the faces and hair are disregarded;

generate a second cluster of images using clothes data representing the set of clothing signatures, the second cluster comprising images with a common set of clothes, the second cluster separately clustering the images as compared to the first cluster according to clothing worn by people in the images irrespective of the people wearing the clothing; and use the first and second clusters to link an image of the person to the clusters in order to generate a third cluster for the person, wherein a clothing signature is generated by:

using the face data defining respective facial regions for identified faces, and, on the basis of the facial regions, defining respective corresponding regions for hair and clothing;

using image pixel data within the facial and hair regions, generating a measure of the skin and hair tones for the person; and using the measure to discard those regions of the image corresponding to skin and hair within the clothing region in order to provide a clothing mask representing a region of clothing for the person.

6. A non-transitory computer-readable data storage medium storing computer-executable code executable by a processor to perform a method comprising:

detecting faces in respective images to generate face data;

generating a first cluster of images using the face data, the first cluster comprising images with a common face and representing a corresponding person;

generating a second cluster of images using clothes data representing a set of clothing signatures, the second cluster comprising images with a common set of clothes, the second cluster separately clustering the images as compared to the first cluster according to clothing worn by people in the images irrespective of the people wearing the clothing; and using the first and second clusters to link an image of the person to the clusters in order to generate a third cluster for the person, wherein a clothing signature is generated by:

using the face data, defining respective facial regions for identified faces, and, on the basis of the facial regions, defining respective corresponding regions for hair and clothing;

using image pixel data within the facial and hair regions, generating a measure of the skin and hair tones for the person; and using the measure to discard those regions of the image corresponding to skin and hair within the clothing region in order to provide a clothing mask representing a region of clothing for the person.

7. The non-transitory computer-readable data storage medium of claim 6, wherein the method further comprises:

segmenting the facial, clothing and hair regions into relatively smaller regions; and discarding any of the smaller regions representing background or overlapping areas.

8. The non-transitory computer-readable data storage medium of claim 6, wherein generating a measure of the skin and hair tones comprises clustering pixels in the skin and hair regions using a Gaussian Mixture Model.

9. The non-transitory computer-readable data storage medium of claim 6, wherein generating a clothing signature comprising clustering pixels in the clothing segment using a Gaussian Mixture Model.

10. The non-transitory computer-readable data storage medium of claim 6, wherein the Gaussian Mixture Model uses a pixel value in the CIELAB colour space.

11. The non-transitory computer-readable data storage medium of claim 6, wherein the method further comprises:

generating a distance matrix in which each item of the matrix represents a dissimilarity between two pieces of clothing.

12. The non-transitory computer-readable data storage medium of claim 11, wherein the method further comprises:

using the distance matrix, grouping clothes pieces into multiple clothing clusters using average-link hierarchical clustering.

* * * * *